United States Patent
Carroll, III et al.

(10) Patent No.: US 6,439,202 B1
(45) Date of Patent: Aug. 27, 2002

(54) HYBRID ELECTRONICALLY CONTROLLED UNIT INJECTOR FUEL SYSTEM

(75) Inventors: John T. Carroll, III; Donald J Benson; Lester L Peters, all of Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 09/986,481

(22) Filed: Nov. 8, 2001

(51) Int. Cl.$^7$ ............................................. F02M 37/04
(52) U.S. Cl. ...................... 123/467; 123/446; 123/300
(58) Field of Search ................................ 123/299, 300, 123/467, 446, 496

(56) References Cited

U.S. PATENT DOCUMENTS

| | | | |
|---|---|---|---|
| 4,425,894 A | 1/1984 | Kato et al. | |
| 4,554,903 A | 11/1985 | Straubel et al. | |
| 4,653,448 A | 3/1987 | Ohmori et al. | |
| 4,759,330 A | 7/1988 | Kato et al. | |
| 4,784,101 A | 11/1988 | Iwanaga et al. | |
| 4,905,960 A | 3/1990 | Barnhart et al. | |
| 4,971,016 A | 11/1990 | Peters et al. | |
| 5,094,215 A | 3/1992 | Gustafson | |
| 5,133,645 A | 7/1992 | Crowley et al. | |
| 5,301,875 A | 4/1994 | Gant et al. | |
| 5,315,973 A | 5/1994 | Hill et al. | |
| 5,463,996 A | 11/1995 | Maley et al. | |
| 5,535,723 A | 7/1996 | Gibson et al. | |
| 5,551,398 A | 9/1996 | Gibson et al. | |
| 5,622,152 A | * 4/1997 | Ishida | 123/446 |
| 5,676,114 A | 10/1997 | Tarr et al. | |
| 5,732,679 A | * 3/1998 | Takahasi et al. | 123/467 |
| 5,819,704 A | 10/1998 | Tarr et al. | |
| 5,915,623 A | 6/1999 | Knight et al. | |
| 5,927,614 A | 7/1999 | Touvelle et al. | |
| 5,931,139 A | 8/1999 | Mack | |
| 5,979,410 A | * 11/1999 | Grieshaber | 123/467 |
| 6,092,509 A | * 7/2000 | Tanabe et al. | 123/447 |
| 6,098,903 A | 8/2000 | Touvelle et al. | |
| 6,112,721 A | * 9/2000 | Kouketsu et al. | 123/447 |
| 6,213,098 B1 | * 4/2001 | Kato et al. | 123/467 |

FOREIGN PATENT DOCUMENTS

JP 8-158986 6/1996

OTHER PUBLICATIONS

Gerhard Stumpp et al., "Common Rail—An Attractive Fuel injection System for Passenger Car DI Diesel Engines", SAE Technical Paper No. 960870, Feb. 26–29, 1996, pp. 183–191.

D.H. Gibson et al., "Meeting the Customer's Needs—Defining the Next Generation Electronically Controlled Unit Injector Concept for Heavy Duty Diesel Engines", SAE Technical Paper No. 961285, Apr. 16–17, 1996, pp. 1–9.

N. Guerrassi et al., "A Common Rail Injection System for High Speed Direct Injection Diesel Engines", SAE Technical Paper No. 980803, Feb. 23–26, 1998, pp. 13–20.

* cited by examiner

Primary Examiner—Carl S. Miller
(74) Attorney, Agent, or Firm—Nixon Peabody LLP; Charles M. Leedom, Jr.; Tim L. Brackett, Jr.

(57) ABSTRACT

An improved fuel injection system is provided which incorporates a common rail and a plurality of unit injectors which function together to efficiently produce various injection rate shapes and different combinations of discreet and blended pilot, main, post and after treatment fuel injection events during a single injection. The fuel injection system effectively permits flexible, responsively timed, square shaped, discreet low to mid pressure level injections utilizing the fuel pressure of the common rail while also allowing the unit injector portion to function independently to produce flexible and responsively timed and pressure controlled, triangular shaped high pressure fuel injection events and to recover excess energy. In one embodiment, a separate common rail pump is avoided by utilizing the unit injector plunger to replace fuel into the common rail which was previously injected.

24 Claims, 9 Drawing Sheets

HYBRID ELECTRONICALLY CONTROLLED UNIT INJECTOR FUEL SYSTEM

TECHNICAL FIELD

This invention relates to a fuel system for an internal combustion engine and more particularly to a unit injector fuel system including a common rail capable of offering a variety of injection pressure and rate-shaping characteristics.

BACKGROUND

A fuel system is the component of an internal combustion engine which often has the greatest impact on performance and cost. Accordingly, fuel systems for internal combustion engines have received a significant portion of the total engineering effort expended to date on the development of the internal combustion engine. For this reason, today's engine designer has an extraordinary array of choices and possible permutations of known fuel system concepts and features. Design effort typically involves extremely complex and subtle compromises among considerations such as cost, size, reliability, performance, ease of manufacture, and retrofit capability on existing engine designs.

The challenge to contemporary designers has been significantly increased by the need to respond to governmentally mandated emissions abatement standards while maintaining or improving fuel efficiency. In view of the mature nature of fuel system designs, it is extremely difficult to extract both improved engine performance and emissions abatement from further innovations in the fuel system art. Commercially competitive fuel injection systems of the future will almost certainly need to not only incorporate new design features for better achieving various objectives including improved engine performance and emissions abatement but, combine the appropriate features in the most effective manner to form a system capable of most efficiently, effectively and reliably achieving the greatest number of objectives.

Some of the most important features for achieving objectives such as improved engine performance and emissions abatement include high injection pressure capability, improved hydraulic and mechanical efficiency, quick pressure response and effective and reliable injection rate shaping capability. Other important features include drive train noise control and packaging flexibility for enabling installation on various engine configurations including retrofitting existing engines. In recent years, in an effort to provide greater operating flexibility and performance, the fuel systems industry has focused considerable attention on developing energy accumulating, nozzle controlled concepts that provide engine speed and load independent control over fuel injection timing, pressure, quantity and multiple injection rate shaping. This attention has lead to the commercialization of fuel systems packaged in the general form of a fluid pressurizing pump connected to a hydraulic energy storage device, i.e. an high pressure accumulator or common rail, connected to one or more electrically operable injector nozzles. SAE Technical Papers 960870 and 980803 both disclose common rail fuel injection systems having a high pressure common rail containing high pressure fuel for delivery to multiple injectors. Each injector includes a servo-controlled needle valve element assembly. The assembly includes a control volume in communication with an outer end of the needle valve element, a drain circuit for draining fuel from the control volume to a low pressure drain, and an injection control valve positioned along the drain circuit for controlling the flow of fuel through the drain circuit so as to cause the movement of the needle valve element between open and closed positions. Opening of the injection control valve causes a reduction in the fuel pressure in the control volume resulting in a pressure differential which forces the needle valve open, and closing of the injection control valve causes an increase in the control volume pressure and closing of the needle valve. U.S. Pat. No. 5,133,645 to Crowley et al. discloses a similar system. These systems all permit speed and load independent pressure control, a broad fuel injection timing range, and fast injection timing, quantity, and multiple pulse rate shaping transient response. However, in these systems, fuel injection pressure is varied by changing the pressure in the entire common rail making fuel pressure responsiveness difficult to achieve. Moreover, the large volume of fuel at high pressure requires more expensive seals along with greater risk of leakage and repair costs.

Another conventional approach is disclosed in U.S. Pat. Nos. 5,535,723 and 5,551,398 and SAE Technical Paper 961285 which disclose a unit fuel injector system including a mechanically actuated plunger in each injector and a servo-controlled needle valve element assembly. Fuel is supplied to each injector at a low supply pressure and pressurized by the plunger to a very high injection pressure. Each of these systems also includes a pump control valve for controlling the flow out of a pumping chamber to control the pressurization of the fuel to a high pressure level. These systems advantageously permit very high injection pressures. U.S. Pat. No. 5,463,996 issued to Maley et al. discloses a similar system wherein the high pressure fuel for injection is generated by a hydraulically driven intensifier plunger.

Consequently, there is a need for a high pressure fuel system for an internal combustion engine which is capable of providing enhanced operating flexibility and performance with respect to at least injection pressure and rate shaping while protecting investments in existing engine architectures.

SUMMARY OF THE INVENTION

It is an object of the present invention, therefore, to overcome the disadvantages of the prior art and to provide a fuel injection system capable of effectively and predictably controlling fuel injection timing and metering.

It is another object of the present invention to provide a fuel injection system capable of controlling fuel injection pressure independent from engine speed.

It is yet another object of the present invention to provide a fuel injection system capable of providing greater operating flexibility and performance.

It is a further object of the present invention to provide a fuel injection system capable of providing a wide range of selectable injection pressure levels for creating multiple injections including pilot and/or post injections in combination with a main injection event.

It is a still further object of the present invention to provide a highly efficient high pressure fuel injection system capable of recuperating the pressure energy stored in the pressurized fuel in the common rail following an injection event.

Yet another object of the present invention is to provide a fuel injection system which protects investments in existing engine architectures by being easy to retrofit on existing mechanically operated unit injector-equipped engines.

Still another object of the present invention is to provide a fuel injection system capable of providing extremely high pressures main injections while permitting lower pressure pilot injections.

A still further object of the present invention is to provide a fuel injection system capable of combining the desirable features of mechanically operated unit injectors and contemporary common rail concepts in packaging that is cost effective.

Yet another object of the present invention is to provide a fuel injection system which provides rapid pressure response, improved small injection metering repeatability and accuracy, improved limp home and fail safe functionality and energy recovery for improved operating efficiency.

Another object of the present invention is to provide a fuel system capable of high pressure injections, triangular rising rate shape and high modularity and redundancy.

It is yet another object of the present invention to provide a high pressure fuel injection system capable of a broad fuel injection timing range supporting pilot, main, post and after treatment needs; speed and load independent pressure control; low noise, vibration and harshness (NVH); and high operating efficiency.

It is still another object of the present invention to provide a high pressure fuel injection system capable of fast injection timing, quantity, pressure and multiple pulse rate shaping transient response.

A still further object of the present invention is to provide a fuel system capable of producing a variety of different combinations of discrete and blended pilot, main, post and after treatment fuel injection events during a single combustion cycle.

These and other objects are achieved by providing a fuel injection system for controlling fuel injection into combustion chambers of a multi-cylinder internal combustion engine, comprising a low pressure fuel supply for supplying fuel at a low supply pressure level, a common rail fluidically connected to the low pressure fuel supply and containing injection fuel at a common rail pressure level greater than the low supply pressure level, and a plurality of fuel injectors connected to the common rail to receive fuel from the common rail and inject fuel at a high pressure level greater than the common rail pressure level. Each of the plurality of injectors includes an injector body containing an injector cavity, a fuel transfer circuit and an injection orifice formed at one end of the injector body, a plunger reciprocally mounted in the injector cavity, and a high pressure chamber formed between the plunger and the injection orifice. The plunger is movable into the high pressure chamber to increase the pressure of fuel in the high pressure chamber to a high pressure level greater than the common rail pressure level. Each injector also includes a nozzle assembly including a needle valve element reciprocally mounted for movement between a closed position blocking fuel flow through the injection orifice and an open position permitting fuel flow through the injection orifice. Each fuel injector further includes a needle valve control device adapted to move the needle valve element between the closed and open positions to initiate an injection event to inject the fuel at the common rail pressure when the injection system is operating in a first mode and at the high pressure level when the injection system is operating in a third mode. The needle valve control device includes a control volume, a drain circuit for draining fuel from the control volume to a low pressure drain and an injection control valve positioned along the drain circuit for controlling the flow fuel through the drain circuit so as to cause the movement of the needle valve element between the open and the closed positions. The fuel injection system further includes a pump control valve for controlling the flow of fuel into the high pressure chamber.

Preferably, the common rail pressure is greater than approximately 15 MPa and, more specifically, in the range of approximately 20–50 MPa. The system may further include a common rail pump for receiving low pressure fuel from the low pressure fuel supply and delivering the fuel to the common rail at at least the common rail pressure level. The system may further include an accumulator connected to the common rail and a pressure limiter for directing high pressure fuel to the common rail during the third mode to prevent overpressurization. The fuel injection system may further include a variable inlet metering orifice positioned upstream of the common rail pump and a low pressure regulator positioned between the low pressure fuel supply and the variable inlet metering orifice.

In one embodiment, the fuel injection system may include a first branch circuit extending from the low pressure fuel supply and a second branch circuit extending from the low pressure fuel supply in parallel to the first branch circuit wherein the common rail is positioned along the first branch circuit and the pump control valve is positioned to receive fuel from the second branch circuit. In this embodiment, a check valve may be positioned along the fuel transfer circuit to permit fuel flow from the common rail to the closed nozzle assembly while preventing flow from the common rail to the high pressure chamber when the injection system is operating in the first mode and permitting high pressure fuel flow from the high pressure chamber to the nozzle valve assembly while preventing fuel flow from the common rail to the nozzle valve assembly when the injection system is operating in the third mode.

In multiple embodiments, the plunger is movable to spill fuel from the high pressure chamber through the pump control valve into one of a supply rail and a common rail. In these embodiments, the injection system is operable in a second mode to move the needle valve element between the closed and the open positions to initiate an injection event to inject fuel during spilling of fuel from the high pressure chamber. The plunger may be movable through a retraction stroke to refill the high pressure chamber with fuel. In this case, the injection system is operable in a fourth mode to move the needle valve element between the closed and the open positions to initiate an injection event to inject fuel during refill of the high pressure chamber. The low pressure fuel supply may include a low pressure supply pump and a supply rail positioned in parallel with the common rail for receiving fuel from the low pressure supply pump. In one embodiment, the high pressure chamber is fluidically connected to the supply rail so as to receive low pressure fuel directly from the supply rail and fluidically connect the common rail to receive fuel at common rail pressure directly from the common rail via the pump control valve. A check valve may be positioned between the supply rail and the high pressure chamber to permit fuel flow from the supply rail to the high pressure chamber while preventing fuel flow from the high pressure chamber to the supply rail. The injection system may be operable in a common rail recharge mode during which the plunger moves at least partially through the retraction stroke while the pump control valve is maintained in a closed position to cause fuel flow from the supply rail through the check valve into the high pressure chamber.

DETAILED DESCRIPTION OF THE INVENTION

Figure 1:
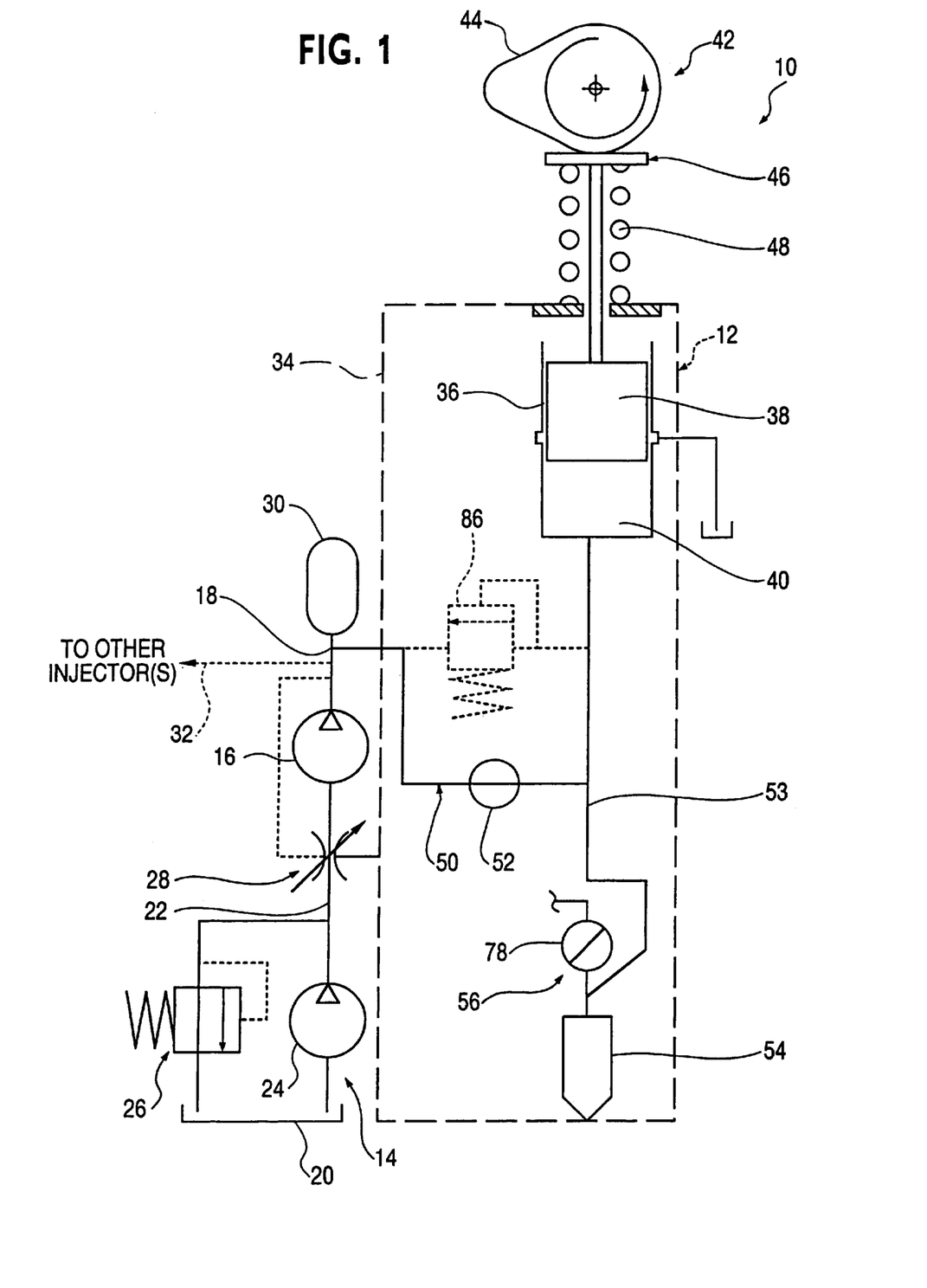
FIG. 1 is a schematic view of a first embodiment of the fuel injection system of the present invention.
Figure 2:
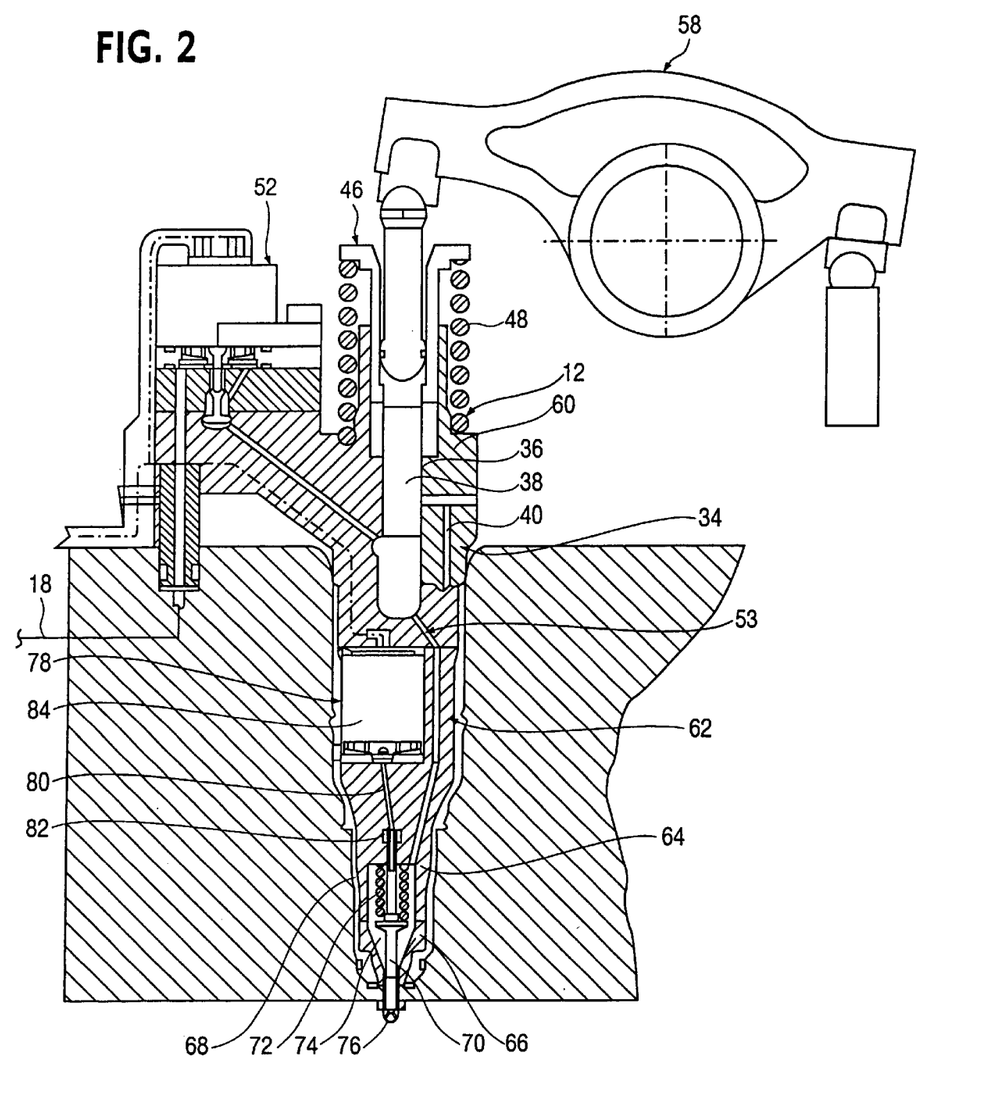
FIG. 2 is a cross-sectional view of a closed nozzle injector used in the fuel injection system of FIG. 1.

Referring to FIGS. 1 and 2, there is shown a needle controlled, common rail fuel injection system 10 of the present invention including a mechanically actuated unit injector 12 resulting in a flexible, efficient system capable of producing various combinations of discreet and blended pilot, main, post, and after treatment fuel injection events during a single injection period of a single combustion cycle. Fuel injection system 10 includes a low pressure fuel supply 14 for supplying fuel at a low supply pressure level, a common rail pump 16 for receiving fuel at the low supply pressure level and increasing the pressure to a common rail pressure level, and a common rail 18 containing fuel at the common rail pressure level. Unit fuel injector 12 is connected to common rail 18 for receiving fuel at the common rail pressure level for injection into the combustion chamber of an engine at the common rail pressure level or at a higher pressure level as discussed hereinbelow. Although only one unit fuel injector 12 is shown in detail, it is understood that fuel injection system 10 includes at least one fuel injector for each cylinder of a multi-cylinder internal combustion engine having any number of cylinders, such as four, six, eight, ten or twelve cylinders.

Low pressure fuel supply 14 includes a fuel source 20, i.e. fuel tank, a low pressure supply rail 22, and a low pressure fuel supply pump 24 for pumping fuel from fuel source 20 to supply rail 22. A low pressure regulator 26 may be provided to maintain the fuel pressure in supply rail 22 at approximately a desired pressure level, e.g. 2 MPa, by returning excess fuel to the fuel tank 20 as necessary. Fuel flows from supply rail 22 to the inlet side of common rail pump 16. An adjustable or variable inlet metering orifice 28 may be provided immediately upstream of common rail pump 16 to restrict fuel flow to common rail pump 16 to maintain the outlet side pressure from common rail pump 16 within a desired predetermined pressure range, i.e. 20–50 MPa. Common rail pump 16 supplies fuel within the predetermined pressure range to common rail 18, thereby maintaining the fuel pressure in common rail 18 at a predetermined common rail pressure level within the desired pressure range. A discreet or distributed accumulator 30 may be connected to common rail 18 to ensure an adequate supply of pressurized fuel at the common rail pressure level throughout fuel system operation. Common rail 18 may be in the form of a drilling formed in the cylinder head of an engine or, alternatively, may be a separate section of high pressure tubing. Again, although only one fuel injector 12 is shown in FIG. 1, additional fuel injectors, although not shown, are connected to common rail 18 at, for example, 32.

Referring to FIG. 1, a schematic representation of the unit fuel injector 12 is illustrated which includes an injector body, indicated generally at 34, which includes a plunger bore 36 and a plunger 38 reciprocally mounted in plunger bore 36 to form a high pressure chamber 40. Plunger 38 is movable through an advancement stroke under the force of a plunger actuating assembly 42 to raise the pressure of fuel in high pressure chamber 40 from the common rail pressure level to a high pressure level, i.e. 50–200 MPa. In the embodiment of FIG. 1, plunger actuating assembly 42 includes an overhead cam 44, a coupling or tappet 46 for continuously abutting cam 44 and a coupling spring 48 for providing an upward bias against tappet 46 to force tappet 46 against cam 44. Tappet 46 is connected to plunger 38 thereby biasing plunger 38 upwardly as shown in FIG. 1 causing plunger 38 to move through a retraction stroke as tappet 46 moves toward the inner base circle of cam 44. As cam 44 rotates and tappet 46 moves toward the outer base circle of cam 44, spring 48 is compressed and plunger 34 is moved through an advancement stroke expelling fuel from chamber 40. As discussed hereinbelow, the fuel expelled from chamber 44 may be at a high pressure level or at some lower pressure level depending on the operation of the system. Fuel injector 12 also includes a fuel supply transfer circuit 50 connecting fuel injector 12 to common rail 18. In addition, fuel injector 12 includes a pump control valve 52 mounted along fuel supply transfer circuit 50 for controlling communication between common rail 18 and high pressure chamber 40. Fuel supply transfer circuit 50 also includes a delivery passage 53 connecting high pressure chamber 40 to a nozzle assembly 54, preferably of the closed nozzle type. A needle valve control device 56 is provided within injector body 34 to control the operation of closed nozzle assembly 54 as described more fully hereinbelow.

The components of fuel injector 12 briefly described hereinabove relative to FIG. 1 will now be described in more detail with respect to the exemplary embodiment of FIG. 2. The injector of FIG. 2 includes all the components described in the injector of FIG. 1 and is merely a practical embodiment of the schematic representation of the injector of FIG. 1 except that the plunger actuating assembly of FIG. 2 includes a rocker arm assembly 58 pivoted by, for example, a cam and push rod assembly. In this practical embodiment, injector body 34 includes a barrel 60 containing the plunger bore 36, a valve housing 62, an upper nozzle housing 64, a lower nozzle housing 66 and a retainer 68. The outer end of retainer 68 contains internal threads for engaging corresponding external threads on the lower end of barrel 60 to permit the entire set of injector body components to be held together by simple relative rotation of retainer 68 with respect to barrel 60. Closed nozzle assembly 54 is of a conventional design including a needle valve element 70 biased into a closed position by spring 72 to prevent fuel flow from needle cavity 74 through injector orifices 76 into a combustion chamber. Needle valve control device 56 controls the opening of needle valve element 70 by controlling the fuel pressure forces acting on needle valve element 70. In particular, in the present embodiment, needle valve control device 56 includes an injection control valve 78 for controlling the flow of fuel through a drain passage 80 connected to a control volume 82 positioned at the outer end of needle valve element 70 as fully described in U.S. Pat. No. 5,819,704, the entire contents of which is hereby incorporated by reference. When injection control valve 78 is in a closed position, drain flow through drain circuit 80 is blocked thereby causing the fuel pressure in control volume 82 to increase to a level sufficient to cause the pressure-induced closing bias forces on needle valve element 70 to be sufficient in combination with spring 72 to bias needle valve element 70 into the closed position. To initiate an injection event, injection control valve 78 is actuated and opened to allow high pressure fuel to drain from control volume 82 through drain circuit 80 thereby creating a pressure force imbalance on needle valve element 70 which permits the movement of needle valve element 70 into an open position to initiate an injection event. Injection control valve 78 includes an actuator assembly 84 for moving the control valve between open and closed positions. Actuator assembly 84 may be a solenoid actuator assembly such as disclosed in U.S. Pat. No. 6,056,264 or U.S. Pat. No. 6,155,503, the entire contents of both of which are incorporated herein by reference.

As shown in FIGS. 1 and 2, pump control valve 52 is preferably mounted on injector body 34. Pump control valve 52 may be a pressure balanced or outwardly opening, or hybrid type two-way valve operated by, for example, a solenoid actuator. For example, pump control valve 52 may be of the type disclosed in U.S. Pat. No. 4,905,960 or U.S. Pat. No. 6,045,120, the entire contents of both of which are hereby incorporated by reference. Although in the exemplary embodiment shown in FIG. 2, pump control valve 52 is mounted on the side of injector body 34, the present invention is intended to encompass a pump control valve positioned in other locations, such as separate from the injector or mounted along the central longitudinal axis of the injector such as suggested by U.S. Pat. No. 5,301,875, the contents of which is hereby incorporated by reference.

Fuel injector 12 may further include a pressure limiter valve 86 (FIG. 1) to provide passive over-pressure protection in certain operational scenarios as described hereinbelow in order to ensure spilling of high pressure fuel during the conclusion of a main injection event to prevent over-pressurization by plunger 38 thereby protecting the injector. However, it should be noted that pressure limiter valve 86 may not be necessary where pump control valve 52 is of a pressure balanced design to permit the spilling of high pressure fuel at the conclusion of a main injection event.

Figure 3A:
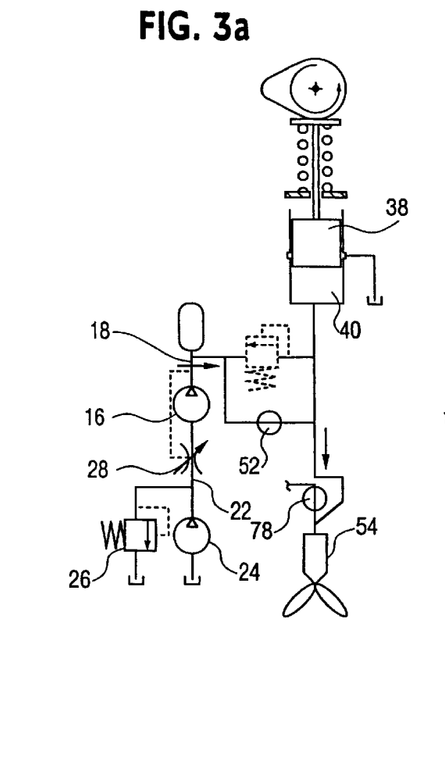
FIGS. 3a–3d are schematic views of the system of FIG. 1 showing various operating modes.

Reference is now made to FIGS. 3a–3d for discussion of four different modes of operation for injecting fuel at different pressures to achieve different injection rate shapes. Referring to FIG. 3a, fuel injection system 10 may be operated in a first mode wherein fuel from common rail 18 at the common rail pressure level is injected. As shown in FIG. 3a, the first mode, or common rail injection mode, occurs during a dwell period of plunger 38 as it is maintained in its retracted position with tappet 46 riding on the inner base circle of cam 44. Pump control valve 52 is maintained in its normally open position permitting fuel to flow from common rail 18 into the inner passages and cavity of fuel injector 12. At a predetermined time, normally closed injection control valve 78 of needle valve control device 56 is opened by actuator assembly 84 (FIG. 2). As fuel from control volume 82 flows through drain passage 80 (FIG. 2), the fuel pressure forces acting on needle valve element 70 become imbalanced sufficiently so that the opening forces overcome the combined fuel pressure closing force and the closing force of spring 72 thereby causing needle valve element 70 to move into an open position to initiate injection. After a predetermined injection time period, the injection event is terminated by actuating actuator assembly 84 causing injection control valve 78 to move to a closed position stopping fuel flow through drain passage 80 thereby allowing the fuel pressure in control volume 82 to increase to common rail pressure resulting in the closing of needle valve element 70. The available pressure drop across injection orifices 76, the effective flow area through the injection orifices and the duration of the opening of needle valve element 70, all determine the quantity of fuel delivered to the combustion chamber of an engine. The shape of the fuel injection rate versus time is naturally square.

Figure 3B:
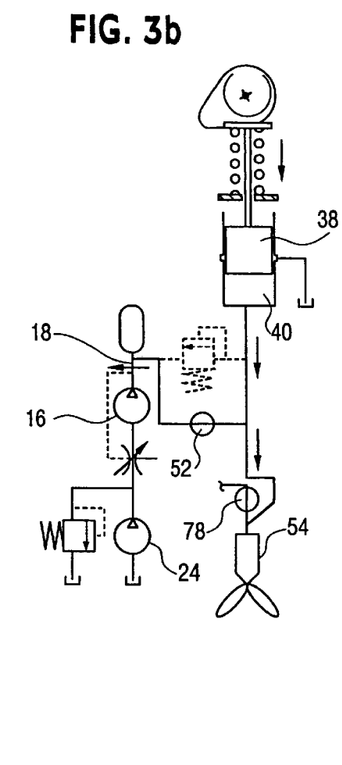

As cam 44 begins to move plunger 38 through an advancement stroke as shown in FIG. 3b, a second mode of fuel injection may be achieved. Specifically, the second mode involves injection at common rail pressure during the spilling of fuel from chamber 40 back into common rail 18 as plunger 38 moves through an advancement stroke. At a predetermined time during the advancement of plunger 38 and the displacement of fuel into common rail 18 through normally open pump control valve 52, actuator assembly 84 is energized and injection control valve 78 moves to an open position. The pressure of the fuel in the high pressure chamber 40 in the second mode is slightly higher than in the first mode. The magnitude of this increase is limited by the ratio of the volume of the common rail 18 to the volume of the high pressure chamber 40 and the flow area of pump control valve 52. The available pressure drop across injection orifices 76, the effective flow area through injection orifices 76 and the duration of the opening of needle valve element 70 again determine the quantity of fuel delivered while the injection rate shape remains naturally square over time.

Figure 3C:
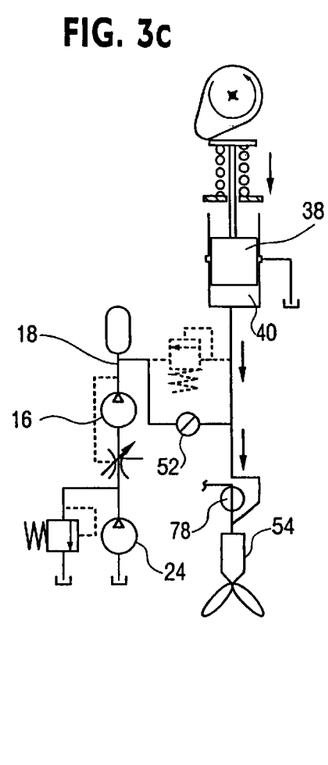

FIG. 3c illustrates a third mode of operation or injection wherein the normally open pump control valve 52 is closed at some point during the advancement stroke of plunger 38. Subsequently, the normally closed injection control valve 78 is opened as plunger 38 continues to advance. Of course, this third mode of injection will occur at a high injection pressure level in the range of approximately 50–200 MPa. The particular rate shape produced during this mode of injection, although naturally triangular, is dependent upon the pumping rate, discharge rate and trapped volume within fuel injector 12.

Figure 3D:
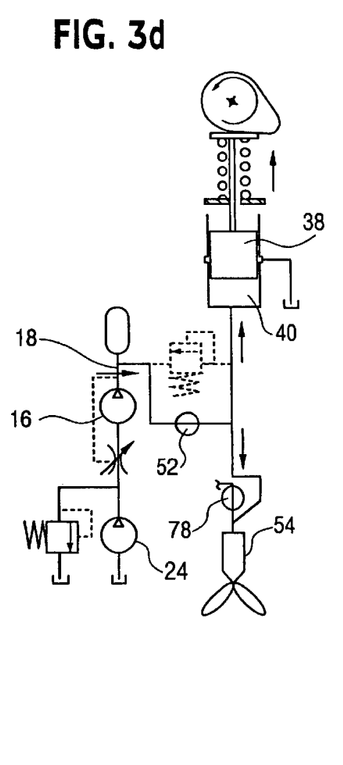

FIG. 3d illustrates yet a fourth mode of operation or injection wherein plunger 38 is moving through a retraction stroke with pump control valve 52 open to permit fuel from common rail 18 to flow through fuel supply transfer circuit 50 into chamber 40 thereby refilling the chamber. During this period, normally closed injection control valve 78 is opened resulting in an injection. The fourth mode permits late cycle injections to control particulates and to regenerate emissions after-treatment devices.

Figure 4A:
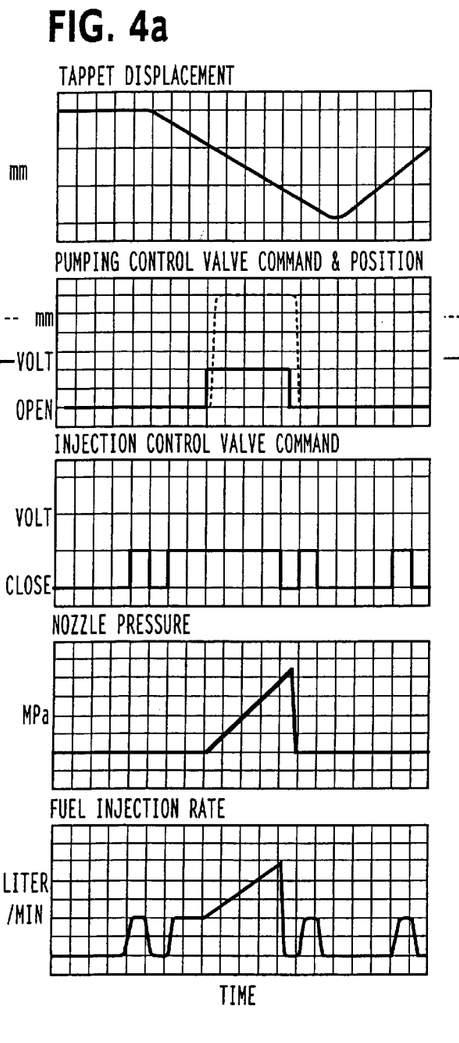
FIGS. 4a and 4b are graphs showing a shorter duration cam lift and a longer duration cam lift, respectively, along with exemplary fuel injection system operating sequences/strategies.
Figure 4B:
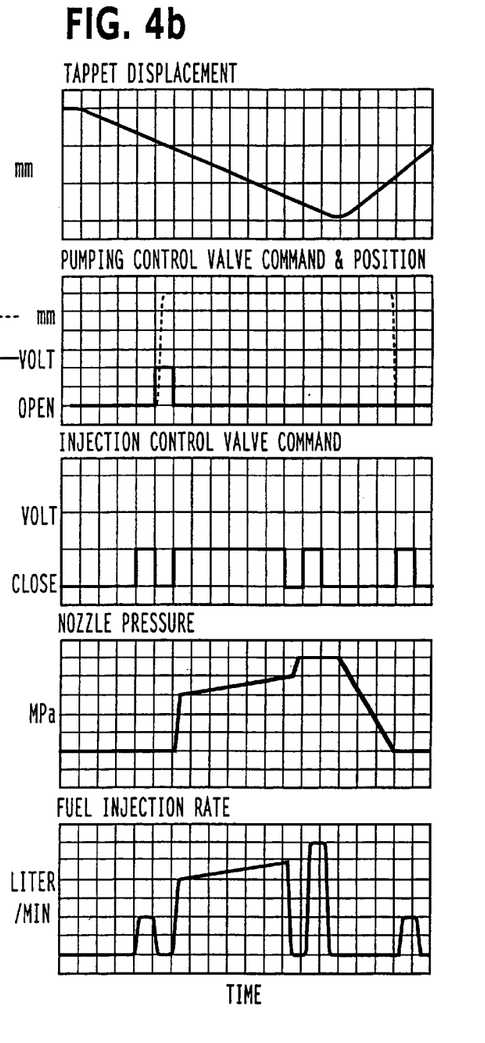

FIGS. 4a and 4b illustrate two hypothetical fuel injection sequences or strategies. In the strategy used in FIG. 4a, the cam is designed to create a shorter duration advancement stroke or lift resulting in a steeper slope of the tappet displacement curve shown in FIG. 4a as compared to FIG. 4b, the strategy of FIG. 4b utilizes a cam designed to create a more gradual, longer duration advancement stroke with the emphasis on storing energy prior to injection and recuperating energy after injection. Referring to FIG. 4a, a pilot injection is achieved by utilizing the first mode of operation (FIG. 3a) wherein the injection control valve 78 is commanded to open resulting in the fuel injection rate curve of FIG. 4a prior to any substantial displacement of the tappet 46/plunger 38. After the first mode of injection has been completed and the pilot injection terminated, a second mode injection is performed with the system operating as shown in FIG. 3b to achieve the initial portion of a primary injection event as shown by the fuel injection rate curve in FIG. 4a. During this second mode injection, the pump control valve is closed to transition into the third mode of injection (FIG. 3c) to increase the fuel injection rate as shown in FIG. 4a. At a predetermined time, injection control valve 78 is closed causing the fuel injection rate to drop dramatically thereby terminating injection as needle valve element 70 closes. Pump control valve 52 is then commanded to open resulting in a high pressure spill as shown by the dramatic decrease in nozzle pressure back to the common rail pressure in FIG. 4a. Subsequently, an early post injection quantity of fuel may be injected using again the second mode of operation as plunger 38 continues to move through the end of its advancement stroke with pump control valve 52 in the open position. Thus injection control valve 78 is again opened and then closed to create a post injection event shown in the injection rate curve of FIG. 4a. A late post injection event may also be used by employing the fourth mode of operation of FIG. 3d upon movement of plunger 38 and tappet 46 through a retraction stroke. In the same manner as the early post injection event, injection control valve 78 is open and then closed to achieve the late post fuel injection rate shape shown in FIG. 4a. Consistent with the strategy of FIG. 4a, pump control valve 52 would be of a pressure balanced design to permit the spilling of high pressure fuel at the conclusion of a main injection event and thus avoiding overpressurization. In this case, a pressure limiter 86 would not be needed.

The operation sequence of FIG. 4b preferably utilizes an outwardly opening design or other suitable design to eliminate parasitic leakage and to simplify the control over the reopening of pump control valve 52. In this case, the pressure limiter 86 would be desirable. Specifically, as shown in FIG. 4b, a first pilot injection is achieved by utilizing the second mode of operation during the advancement stroke of plunger 38. Subsequently, pump control valve 52 is closed causing the inner volume of fuel injector 12 to become pressurized by the compressive force applied by the advancing movement of plunger 38. At a predetermined time, the primary injection event is initiated by opening injection control valve 78 and terminated by closing injection control valve 78 while pump control valve 52 remains in the closed position. Again although pump control valve 52 has been deenergized, since it is of the outwardly opening design, when pump control valve 52 is closed, the high pressure fuel maintains the valve element of pump control valve 52 in a closed position. At the end of the primary injection event, a post injection event may be achieved by again opening and closing injection control valve 78. Unlike the first strategy, this post injection event can be obtained at a high pressure as shown by the injection control valve command and the fuel injection rate curves occurring at the high pressure of the nozzle pressure curve of FIG. 4b. Thus, two injections may occur while operating in the third mode of operation. Once plunger 38 retracts to decrease the pressure on the valve element of pump control valve 52 sufficiently, pump control valve 52 will again open as shown by the pumping control valve position curve in FIG. 4b. At this point, a second post injection event may be achieved by operating the injection control valve to achieve injection at the common rail pressure level while plunger 38 moves through a retraction stroke.

Figure 5:
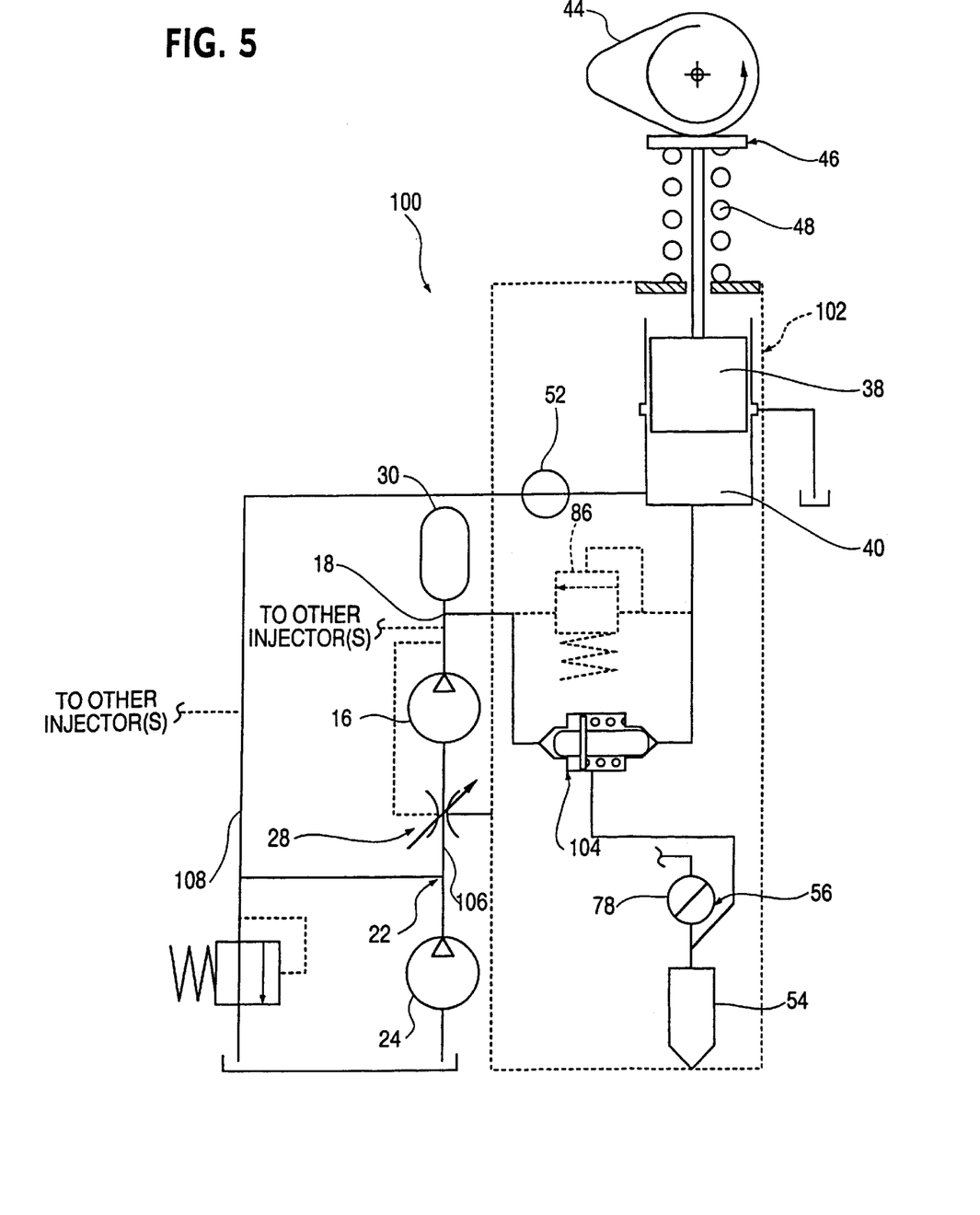
FIG. 5 is a schematic view of a second embodiment of the fuel injection system of the present invention.

Reference is now made to FIG. 5 disclosing a second embodiment of the fuel injection system of the present invention, indicated generally at 100, which is similar to the previous embodiment in many respects and thus like reference numerals will be used to indicate the components and features which are the same or similar to the previous embodiment of FIG. 1. The embodiment of FIG. 5 differs from the first embodiment in that pumping control valve 52 is supplied with fuel directly from supply rail 22 as opposed to being supplied with fuel from common rail 18 as in the first embodiment. It should be noted that the pump control valve 52 may still be mounted on the fuel injector 102 in the manner shown in FIG. 2 or any other variations discussed hereinabove relative to the embodiment of FIG. 1 except that the upstream side of pump control valve 52 would connect to a drilling positioned in communication with supply rail 22. In addition, the present embodiment of FIG. 5 differs from the previous embodiment in that a check valve 104 is utilized to control communication between common rail 18 and the closed nozzle assembly. Specifically, supply rail 22 is divided into a first branch circuit 106 supplying low pressure fuel to common rail pump 16 and a second branch circuit 108 provided in parallel to common rail pump 16 and common rail 18. Pump control valve 52 is positioned along second branch circuit 108 which ultimately connects to chamber 40.

Figure 6A:
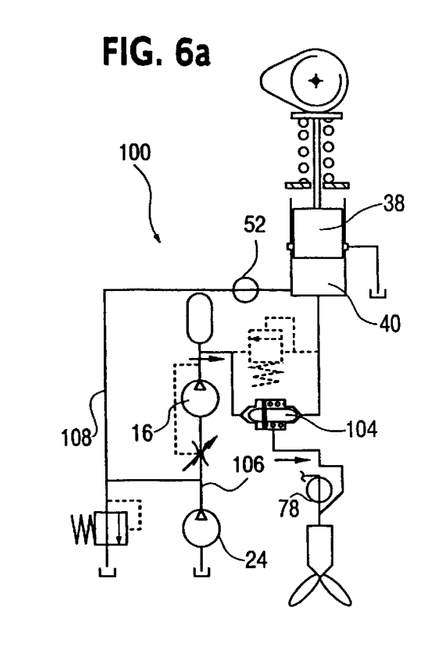
FIGS. 6a–6d are schematic views of the system of FIG. 5 showing various operating modes.
Figure 6B:
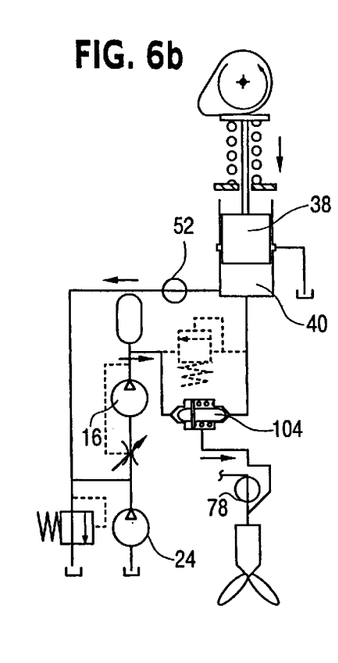
Figure 6C:
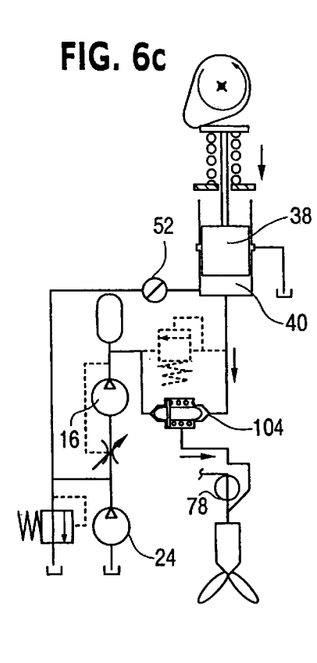
Figure 6D:
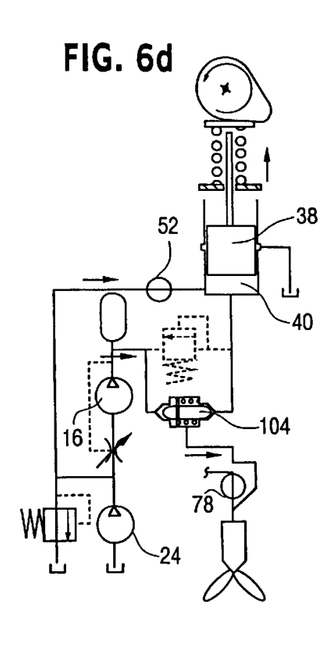

Four distinct injection modes of the second embodiment will now be discussed with reference to FIGS. 6a–6d. It should be noted that the fundamental operation and injection pressures for each mode may be similar to the respective modes of operation for the first embodiment as shown in FIGS. 3a–3d in that the first mode is a common rail injection during a fuel injector dwell; the second mode is a common rail injection during fuel injector spill; the third mode is a high pressure injection during plunger advancement and the fourth mode is a common rail injection during fuel injector refill. More specifically, during the first mode, supply rail fuel is supplied through the second branch 108 and through normally open pump control valve 52 into chamber 40 while plunger 38 is maintained in a retracted position. Meanwhile, common rail fuel is supplied to closed nozzle assembly 54 via check valve 104. Check valve 104 however blocks flow of common rail fuel into chamber 40. Injection control valve 78 is opened and then closed to initiate and terminate, respectively, fuel injection of fuel at common rail pressure. The rate shape of injection is naturally square. During a second mode of injection as shown in FIG. 6b, cam 44 bears against tappet 46 causing compression of spring 48 thereby advancing plunger 38 and displacing fuel from chamber 40 through pump control valve 52 into second branch passage 108. During this spill process, injection control valve 78 is operated to initiate and terminate an injection event as described hereinabove. During this spill injection process, check valve 104 isolates chamber 40 from common rail 18 while allowing common rail fuel to flow to the nozzle assembly 54. The available pressure drop across the injection orifices, the effective flow area of the orifices and the open duration of the needle valve element of the nozzle assembly, again determine the quantity of fuel delivered. High pressure injection is achieved using the third mode of operation with plunger 38 moving through an advancement stroke caused by cam 44. Normally open pump control valve 52 is closed to prevent the further spilling of fuel back into second branch passage 108 and cause an increase in fuel pressure within the injector internal trapped volumes. The injection control valve 78 is then opened and then closed to initiate and then terminate, respectively, the injection of high pressure fuel. Once pump control valve 52 is closed, check valve 104 moves to isolate common rail 18 from closed nozzle assembly 54 while permitting communication between chamber 40 and closed nozzle assembly 54. The rate shape of injection during this high pressure mode is naturally triangular. For the fourth mode of injection as shown in FIG. 6d, fuel at common rail pressure is injected during unit pump refill with pump control valve 52 in the open position supplying refill fuel from second branch circuit 108 into chamber 40 while check valve 104 permits the common rail fuel to flow to nozzle assembly 54. The injection control valve 78 is opened and closed to define the injection event while the injector is being refilled. The rate shape of injection is again naturally square.

Figure 7:
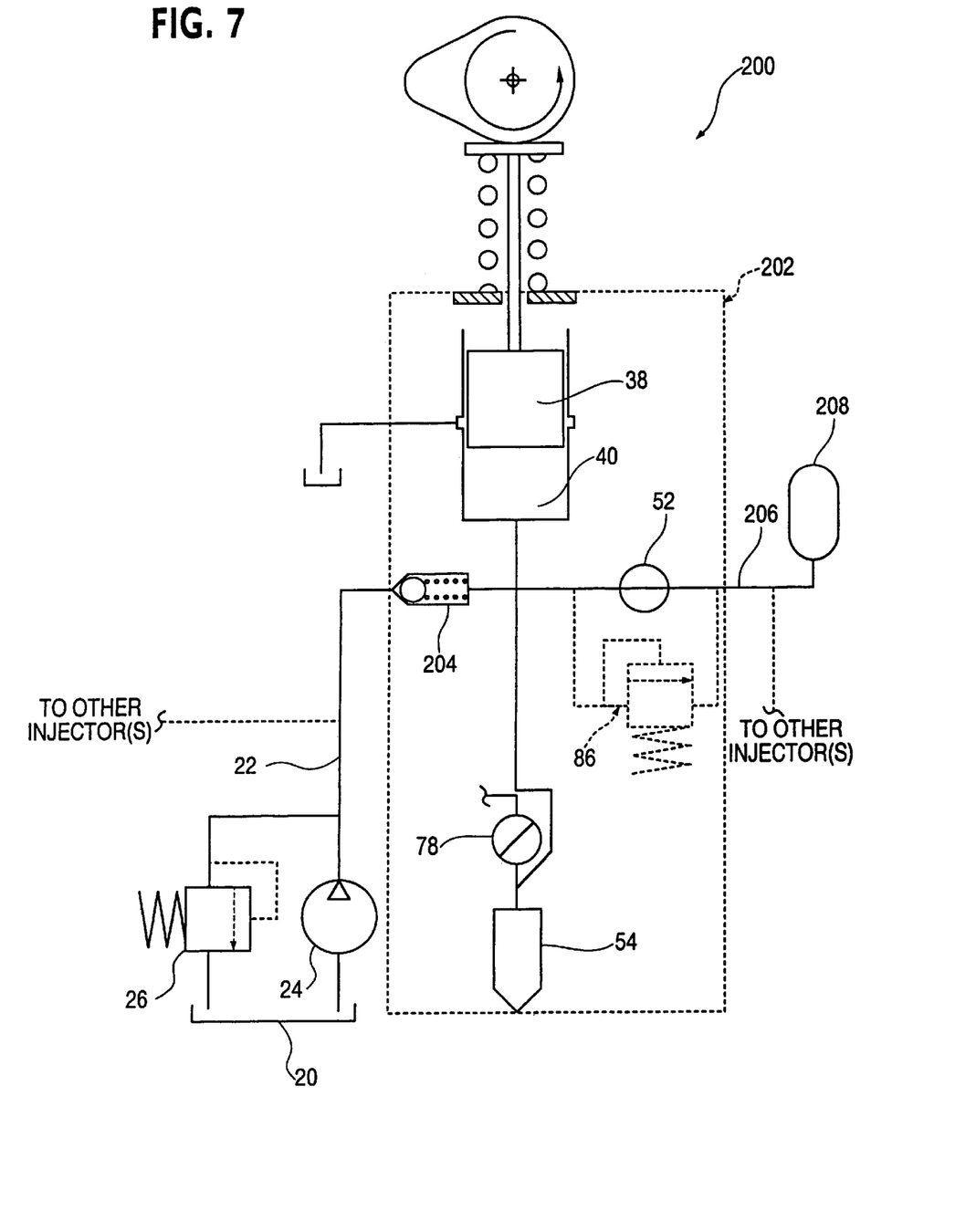
FIG. 7 is a schematic view of a third embodiment of the fuel injection system of the present invention.
Figure 8A:
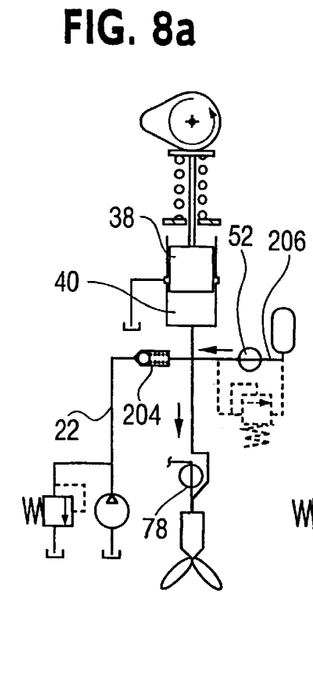
FIGS. 8a–8d are schematic views of the system of FIG. 7 showing various operating modes.

FIG. 7 illustrates a third embodiment of the fuel injection system of the present invention, indicated generally at 200. This embodiment includes many features which are the same and similar to the features disclosed in the first two embodiments and therefore like reference numerals will be used to indicate the same or similar components or features. As in the previous embodiments, low pressure supply pump 24 transfers fuel from the tank 20 to the supply rail 22. The low pressure regulator 26 may be used to maintain pressure in supply rail 22 at the low pressure level, i.e. approximately 2 MPa, by returning excess fuel to tank 20 as necessary. Fuel flows from supply rail 22 to one or more unit injectors 202. Each injector 202 includes a check valve 204 positioned to control flow from supply rail 22 to the injector and to isolate the injector internal volumes from supply rail 202 during all but a refilling phase of operation. The internal volumes of injector 202 communicate with a C4 common rail 206 and an accumulator 208 through the normally open pump control valve 52. CD5 Again, the optional pressure limiter 86 may be provided as an over-pressure bypass circuit around pump control valve 52 should it be convenient or necessary to do so. As described more fully hereinbelow with the description of the operation of system 200, plunger 38 of injector 202 serves two functions in the present embodiment: first, plunger 38 drives the main fuel injection event by pressurizing the fuel to a high pressure level and, second, functions as a common rail pump to pressurize common rail 206 and accumulator 208. Thus, a major distinction between the present embodiment and the two previous embodiments is that the present embodiment does not include a separate common rail pump but relies on the injector plunger 38. Pump control valve 52 functions to allow fuel flow between common rail 206 and chamber 40 alternately serving as inlet metering and pressure control valves. In the former case, pump control valve 52 is maintained in the open position during retraction of plunger 38, fuel from common rail 206 is used to refill chamber 40 and no new fuel from supply rail 22 is supplied through check valve 204. However, pump control valve 52 may be closed to allow the retraction of plunger 38 to draw in fuel from supply rail 22 through check valve 204 thereby adding fuel to the injector and thus allowing plunger 38 to add new fuel to common rail 206 upon the advancement stroke of plunger 38 once pump control valve 52 is open thereby allowing one or more injectors to maintain the pressure in common rail 206 within a desired range throughout engine operation. In the latter case, pump control valve 52 is closed during the advancing stroke of injector plunger 38 to rapidly pressurize fuel in anticipation of or during a main injection event. FIGS. 8a–8e illustrate four modes of fuel injection (8a–8c and 8e) and one mode of refilling chamber 40 and replacing fuel previously removed from common rail 206 (8d). The first fuel injection mode, as shown in FIG. 8a, injects fuel at common rail pressure during the dwell period of injector 202 with plunger 38 neither advancing nor retracting. During this time, pump control valve 52 is in its normally open position to provide fuel at common rail pressure to the internal volumes of injector 202. As discussed hereinabove relative to the previous embodiments, injection control valve 78 is operated to create an injection event at the common rail pressure level. The available pressure drop across the injection orifices, the effective flow area of the injection orifices and the duration of the opening of injection control valve 78, determine the quantity of fuel delivered while the rate shape is naturally square. The second mode of fuel injection is an injection at common rail pressure during fuel spilling from chamber 40 through pump control valve 52 into common rail 206. During the advancement stroke of plunger 38, fuel is displaced from chamber 40 into common rail 206 through the normally open pump control valve 52. It should be noted that common rail 206 and accumulator 30 are sufficiently large to maintain pressure fluctuations during spilling within acceptable limits. The available pressure drop across the injection orifices, the effective flow area of the orifices and the open duration again determine the quantity of fuel delivered.

Figure 8B:
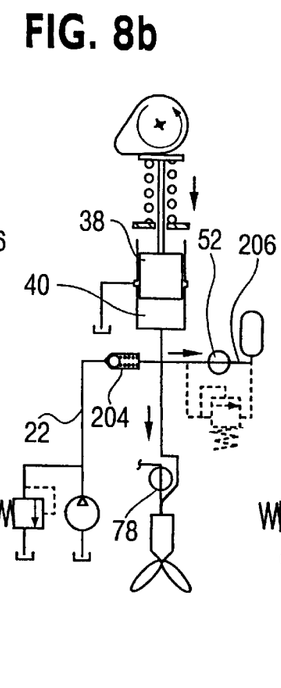
Figure 8C:
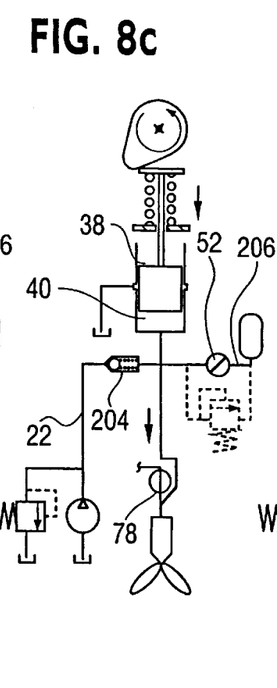

The third mode of fuel injection of the embodiment of FIG. 7 is illustrated in FIG. 8c wherein normally open pump control valve 52 is closed during the advancement stroke of plunger 38. Injection control valve 78 is then opened initiating an injection event of high pressure fuel into the combustion chamber of an engine. The injection event is terminated by reclosing injection control valve 78 and soon after either reopening pump control valve 52 or, optionally, allowing pressure limiter 86 to intervene to limit the maximum internal volume pressure. The natural rate shape produced during this mode of injection is dependent upon the pumping rate, discharge rate and trapped volume. The rate shape is naturally triangular.

Figures 8D, 8E:
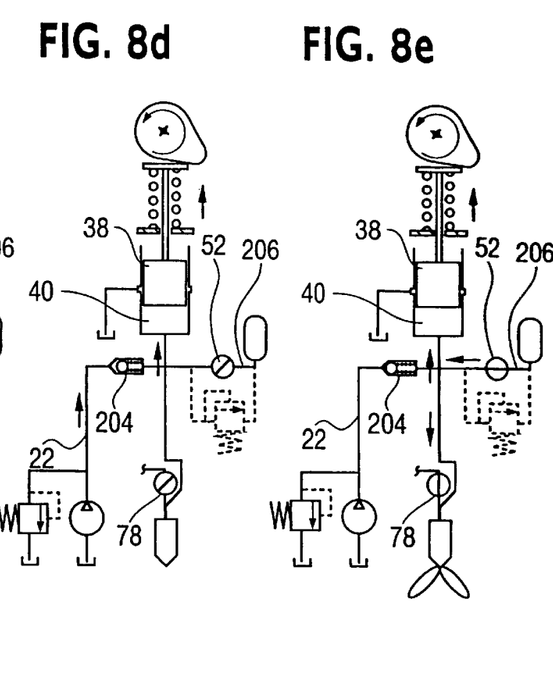

Referring to FIG. 8d, the retraction of plunger 38 presents opportunities to replace fuel volumes previously removed from common rail 206 by the injection process and to perform additional common rail fuel injection events. Refilling occurs when pump control valve 52 is closed and plunger 38 retracts thereby reducing the internal volume pressure below that of the pressure in supply rail 22. Under these conditions, supply fuel passes through check valve 204 and into chamber 40. The refill volume depends upon internal volume size and initial pressure, the rate of plunger retraction, supply rail pressure, the effective flow area through check valve 204 and the timed period that pump control valve 52 remains closed. Opening pump control valve 52 equalizes internal volume and common rail pressures at a level sufficiently above the pressure in supply rail 22 to prevent a further refilling and to close check valve 204 thereby preventing backflow to supply rail 22. Once additional fuel from supply rail 22 is drawn into chamber 40 as shown in FIG. 8d, during the next advancement stroke of plunger 38, this additional fuel can be used to recharge common rail 206 by opening pump control valve 52 as plunger 38 moves through an advancement stroke as shown in FIG. 8b whether or not an injection event occurs during the advancement stroke. The fourth fuel injection mode as shown in FIG. 8e injects fuel at common rail pressure during the retraction stroke of plunger 38. In this mode, pump control valve 52 is opened to allow a flow of fuel from common rail 206.

Figure 9:
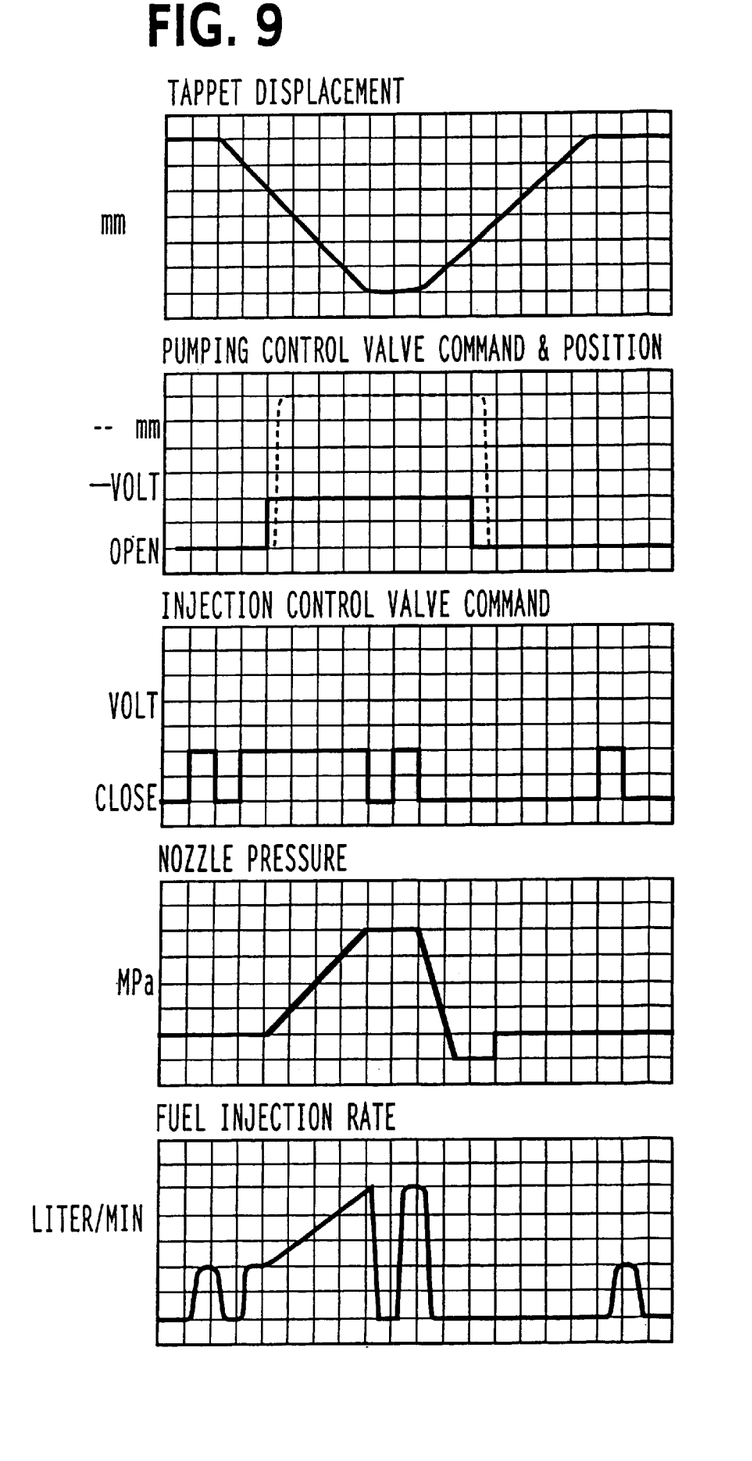
FIG. 9 is a graph showing an exemplary fuel injection sequence for the fuel injection system of FIG. 7.

FIG. 9 illustrates a hypothetical fuel injection sequence/strategy for creating multiple injections during a single combustion cycle. As can be seen by the injection control valve command curve, a pilot injection is created prior to tappet displacement and thus during plunger dwell. This pilot injection is actually the first mode of injection shown in FIG. 8a at the common rail pressure level. Then, as shown by the fuel injection rate curve, a main injection event is initiated at common rail pressure prior to the closing of pump control valve 52. Once the pump control valve 52 is subsequently closed, the fuel injection rate increases until injection control valve 78 is closed to terminate injection. A post injection may then be initiated with residual high pressure fuel remaining in the internal volumes of the injector, pump control valve 52 closed and plunger 38 in its most advanced position. In this example, this post injection event continues slightly into the retraction stroke of plunger 38. A second post injection may then be achieved in a similar manner to the pilot injection.

The embodiment of FIG. 7 demonstrates that only the common rail portion of conventional high pressure common rail fuel systems need be uniquely combined with a unit injector fuel system to create a unique hybrid system to provide synergistic flexibility and performance. The present hybrid system relieves some difficulties relating to design constraints encountered with conventional fuel system concepts. For example, conventional standalone high pressure common rail fuel systems must be designed to meet maximum desired injection pressure and quantity requirements while, at the same time, trapped volumes are typically minimized to improve pressure response. The high pressure common rail portion of the fuel injection system of the present invention supports small quantity pilot, main and post fuel injection events at relatively low and slowly changing, or substantially constant, injection pressures. Also, the unit injector portion of the fuel injection system of the present invention supports large quantity, moderate to high and rapidly responding injection pressures. Consequently, substantial reductions can be made in common rail flow area and maximum pressure capability to realize manufacturing cost savings and package size reductions. Similarly, common rail trapped volume can be increased to reduce pressure fluctuations and injector interactions and to accommodate longer common rail distances on large "V" engines. All embodiments of the present fuel injection system, and particularly the embodiment of FIG. 7, may be able to utilize a low pressure, e.g., 20–50 MPa, common rail formed from a network of cylinder head drillings.

The present invention also presents an opportunity to gain relief from difficult design constraints in the area of cam Hertz stress. The added rate shaping flexibility of the present common rail subsystem and needle valve control device 56 presents an opportunity to utilize less aggressive (i.e. larger minimum radius of curvature and lower acceleration ramp) cam profiles. The Hertz stress reducing benefit of less aggressive cam profiles can be realized in terms of increased load carrying capability at previously acceptable Hertz stress limits or greater durability at lower limits or a combination of the two.

Overall, the present invention addresses the need for a fuel injection system that combines desirable features of traditional mechanically operated unit injector and contemporary high pressure common rail concepts in packaging that is cost effective and directly applicable to current unit injector equipped engines. The fuel injection system of the present invention has the advantages of providing very high injection pressure capability; triangular rising rate shape; high modularity and redundancy; compatibility with existing engine architectures and combustion, performance and emissions (CPE) strategies; while also providing a broad fuel injection timing range supporting pilot, main, post and after treatment needs; ultimately fast injection timing, quantity and multiple pulse rate shaping transient response; speed and load independent pressure control; high mean effective pressure fuel injection; low noise, vibration and harshness (NVH); high operating efficiency; and a closed nozzle design. Moreover, the fuel injection of the present invention desirably achieves rapid (next cylinder to fire) pressure response; improved small injection metering repeatability and accuracy; reduced drain (or return) flow to tank and associated heat rejection; energy recovery for improved operating efficiency and NVH; improved limp home and fail safe functionality; self prime with internal bleed capability; and compatibility with advanced virtual sensor-based injected quantity control, diagnostics and prognostics.

It should be noted that the present invention is compatible with and provides enhanced operating flexibility for incorporating electronically controlled dual needle nozzle assembly technology that utilizes fuel pressure level to select between single needle and dual needle operating modes, such as disclosed in U.S. patent application Ser. No. 09/907,814 filed Jul. 19, 2001, and entitled "Fuel Injector with Injection Rate Control." Enhanced operating flexibility is realized by the present invention because it provides two distinctly different injection pressures (one constant and one variable) during a single multi-pulse injection cycle. The fuel injection system of the present invention is also compatible with leakage control sleeve technology such as disclosed in U.S. Pat. No. 5,899,136, which may be applied to reduce leakage and to minimize trapped volume within the injector. The fuel injection system of the present invention is also compatible with fuel system control technologies that can be used to control fuel injection pressure and quantity and to estimate effective bolt modulus, sensor bandwidth and fuel system static timing.

INDUSTRIAL APPLICABILITY

While the needle controlled fuel system of the present invention is most useful in a compression ignition internal combustion engine, it can be used in any combustion engine of any vehicle or industrial equipment in which accurate, efficient and reliable pressure generation, injection timing and injection metering are essential.

We claim:

1. A fuel injection system for controlling fuel injection into combustion chambers of a multi-cylinder internal combustion engine, comprising:

a low pressure fuel supply for supplying fuel at a low supply pressure level;

a common rail fluidically connected to said low pressure fuel supply and containing injection fuel at a common rail pressure level greater than said low supply pressure level;

a plurality of fuel injectors connected to said common rail to receive fuel from said common rail and inject fuel at a high pressure level greater than said common rail pressure level, each of said plurality of injectors including an injector body containing an injector cavity, a fuel transfer circuit, an injection orifice formed in one end of said injector body, a plunger reciprocally mounted in said injector cavity for movement through advancement and retraction strokes and a high pressure chamber formed between said plunger and said injection orifice, said plunger movable through said advancement stroke to at least one of increase the pressure of fuel in said high pressure chamber to a high pressure level greater than said common rail pressure level and spill fuel to said common rail, a nozzle assembly including a needle valve element reciprocally mounted for movement between a closed position blocking fuel flow through said injection orifice and an open position permitting fuel flow through said injection orifice, a needle valve control device adapted to move said needle valve element between said open and said closed positions to initiate an injection event;

a pump control valve for controlling the flow of fuel into said high pressure chamber; wherein the injection system is operable in a first mode to inject fuel at said common rail pressure through said injector orifice into a combustion chamber, in a second mode to inject fuel during spilling of fuel from said high pressure chamber to one of a supply rail and said common rail as said plunger moves through said advancement stroke and a third mode to inject fuel at said high pressure level during movement of said plunger through said advancement stroke.

2. The system of claim 1, wherein said plunger is movable through said retraction stroke to refill said high pressure chamber with fuel, the injection system being operable in a fourth mode to move said needle valve element between said open and said closed positions to initiate an injection event to inject fuel during refill of said high pressure chamber.

3. The system of claim 1, wherein said low pressure fuel supply includes a low pressure supply pump and a supply rail positioned in parallel with said common rail for receiving fuel from said low pressure supply pump, said high pressure chamber fluidically connected to said supply rail so as to receive low pressure fuel directly from said supply rail and fluidically connected to said common rail to receive fuel at said common rail pressure directly from said common rail via said pump control valve, wherein a check valve is positioned between said supply rail and said high pressure chamber to permit fuel flow from said supply rail to said high pressure chamber while preventing fuel flow from said high pressure chamber to said supply rail.

4. The system of claim 3, wherein the injection system is operable in a common rail recharge mode during which said plunger moves at least partially through said retraction stroke while said pump control valve is maintained in a closed position to cause fuel flow from said supply rail through said check valve into said high pressure chamber.

5. The system of claim 1, wherein said common rail pressure level is greater than approximately 15 MPa.

6. The system of claim 5, wherein said common rail pressure level is in the range of approximately 20–50 MPa.

7. The system of claim 1, further including a common rail pump for receiving low pressure fuel from the low pressure fuel supply and delivering the low pressure to said common rail at at least said common rail pressure level.

8. The system of claim 1, further including an accumulator connected to said common rail and a pressure limiter for directing high pressure fuel to said common rail during said third mode to prevent overpressurization.

9. The system of claim 1, further including a variable inlet metering orifice positioned upstream of said common rail pump and a low pressure regulator positioned between said low pressure fuel supply and said variable inlet metering orifice.

10. The system of claim 1, further including a first branch circuit extending from said low pressure fuel supply and a second branch circuit extending from said low pressure fuel supply in parallel to said first branch circuit, said common rail positioned along said first branch circuit and said pump control valve positioned to receive fuel from said second branch circuit.

11. The system of claim 10, further including a check valve positioned along said fuel transfer circuit for permitting flow from said common rail to said closed nozzle assembly while preventing flow from said common rail to said high pressure chamber when the injection system is operating in said first mode and permitting high pressure fuel flow from said high pressure chamber to said nozzle valve assembly while preventing fuel flow from said common rail to said nozzle valve assembly when the injection system is operating in said third mode.

12. A fuel injection system for controlling fuel injection into combustion chambers of a multi-cylinder internal combustion engine, comprising:

a low pressure fuel supply for supplying fuel at a low supply pressure level;

a common rail fluidically connected to said low pressure fuel supply and containing injection fuel at a common rail pressure level greater than said low supply pressure level;

a plurality of fuel injectors connected to said common rail to receive fuel from said common rail and inject fuel at a high pressure level greater than said common rail pressure level, each of said plurality of injectors including an injector body containing an injector cavity, a fuel transfer circuit, an injection orifice formed in one end of said injector body, a plunger reciprocally mounted in said injector cavity and a high pressure chamber formed between said plunger and said injection orifice, said plunger movable into said high pressure chamber to increase the pressure of fuel in said high pressure chamber to a high pressure level greater than said common rail pressure level, a nozzle assembly including a needle valve element reciprocally mounted for movement between a closed position blocking fuel flow through said injection orifice and an open position permitting fuel flow through said injection orifice, a needle valve control device adapted to move said needle valve element between said open and said closed positions to initiate an injection event to inject fuel at said common rail pressure when the injection system is operating in a first mode and at said high pressure level when the injection system is operating in a third mode, said needle valve control device including a control volume, a drain circuit for draining fuel from said control volume to a low pressure drain, and an injection control valve positioned along said drain circuit for controlling the flow of fuel through said drain circuit so as to cause the movement of said needle valve element between said open and said closed positions; and a pump control valve for controlling the flow of fuel into said high pressure chamber.

13. The system of claim 12, wherein said common rail pressure level is greater than approximately 15 MPa.

14. The system of claim 13, wherein said common rail pressure level is in the range of approximately 20–50 MPa.

15. The system of claim 12, further including a common rail pump for receiving low pressure fuel from the low pressure fuel supply and delivering the fuel to said common rail at at least said common rail pressure level.

16. The system of claim 12, further including an accumulator connected to said common rail.

17. The system of claim 12, further including a pressure limiter for directing high pressure fuel to said common rail during said third mode to prevent overpressurization.

18. The system of claim 15, further including a variable inlet metering orifice positioned upstream of said common rail pump and a low pressure regulator positioned between said low pressure fuel supply and said variable inlet metering orifice.

19. The system of claim 12, further including a first branch circuit extending from said low pressure fuel supply and a second branch circuit extending from said low pressure fuel supply in parallel to said first branch circuit, said common rail positioned along said first branch circuit and said pump control valve positioned to receive fuel from said second branch circuit.

20. The system of claimed 19, further including a check valve positioned along said fuel transfer circuit for permitting flow from said common rail to said closed nozzle assembly while preventing flow from said common rail to said high pressure chamber when the injection system is operating in said first mode and permitting high pressure fuel flow from said high pressure chamber to said nozzle valve assembly while preventing fuel flow from said common rail to said nozzle valve assembly when the injection system is operating in said third mode.

21. The system of claim 12, wherein said plunger is movable to spill fuel from said high pressure chamber through said pump control valve into one of a supply rail and said common rail, the injection system being operable in a second mode to move said needle valve element between said open and said closed positions to initiate an injection event to inject fuel during spilling of fuel from said high pressure chamber.

22. The system of claim 21, wherein said plunger is movable through a retraction stroke to refill said high pressure chamber with fuel, the injection system being operable in a fourth mode to move said needle valve element between said open and said closed positions to initiate an injection event to inject fuel during refill of said high pressure chamber.

23. The system of claim 22, wherein said low pressure fuel supply includes a low pressure supply pump and a supply rail positioned in parallel with said common rail for receiving fuel from said low pressure supply pump, said high pressure chamber fluidically be connected to said supply rail so as to receive low pressure fuel directly from said supply rail and fluidically connected to said common rail to receive fuel at said common rail pressure directly from said common rail via said pump control valve, wherein a check valve is positioned between said supply rail and said high pressure chamber to permit fuel flow from said supply rail to said high pressure chamber while preventing fuel flow from said high pressure chamber to said supply rail.

24. The system of claim 23, wherein the injection system is operable in a common rail recharge mode during which said plunger moves at least partially through said retraction stroke while said pump control valve is maintained in a closed position to cause fuel flow from said supply rail through said check valve into said high pressure chamber.

* * * * *